US012619714B2

(12) United States Patent
Allahdadian et al.

(10) Patent No.: US 12,619,714 B2
(45) Date of Patent: May 5, 2026

(54) COPING WITH FEATURE ERROR SUPPRESSION: A MECHANISM TO HANDLE THE CONCEPT DRIFT

(71) Applicant: Oracle International Corporation, Redwood Shores, CA (US)

(72) Inventors: Saeid Allahdadian, Vancouver (CA); Andrew Brownsword, Vancouver (CA); Milos Vasic, Zurich (CH); Matteo Casserini, Zurich (CH); Amin Suzani, Vancouver (CA); Hamed Ahmadi, Burnaby (CA); Felix Schmidt, Baden-Daettwil (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 996 days.

(21) Appl. No.: 17/122,385

(22) Filed: Dec. 15, 2020

(65) Prior Publication Data

US 2022/0188410 A1 Jun. 16, 2022

(51) Int. Cl.
G06F 21/55 (2013.01)
G06F 18/211 (2023.01)
(Continued)

(52) U.S. Cl.
CPC ............ G06F 21/55 (2013.01); G06F 18/211 (2023.01); G06F 18/2135 (2023.01); G06N 20/00 (2019.01)

(58) Field of Classification Search
CPC ....... G06N 20/00; G06F 21/55; G06F 18/211; G06F 18/2135
See application file for complete search history.

(56) References Cited

U.S. PATENT DOCUMENTS 10,069,900 B2 9/2018 Poola et al.
2002/0169735 A1 11/2002 Kil et al.
(Continued)

FOREIGN PATENT DOCUMENTS

CA            3037326 A1 *  1/2020  ........... G06F 21/552
WO     WO2017/201507 A1   11/2017
WO     WO-2020185101 A9 *  1/2021  ............. G06N 20/10

OTHER PUBLICATIONS

Ritter GX, Urcid G, Lara-Rodríguez LD. Similarity Measures for Learning in Lattice Based Biomimetic Neural Networks. Mathematics. Aug. 27, 2020 (Year: 2020).*
(Continued)

*Primary Examiner* — Adam C Standke
(74) *Attorney, Agent, or Firm* — Hickman Becker Bingham Ledesma LLP

(57) ABSTRACT

Approaches herein relate to reconstructive models such as an autoencoder for anomaly detection. Herein are machine learning techniques that detect and suppress any feature that causes model decay by concept drift. In an embodiment in a production environment, a computer initializes an unsuppressed subset of features with a plurality of features that an already-trained reconstructive model can process. A respective reconstruction error of each feature of the unsuppressed subset of features is calculated. The computer detects that a respective moving average based on the reconstruction error of a particular feature of the unsuppressed subset of features exceeds a respective feature suppression threshold of the particular feature, which causes removal of the particular feature from the unsuppressed subset of features. After removing the particular feature from the unsuppressed subset of features, a loss of the reconstructive model is calculated based on respective reconstruction errors of the unsuppressed subset of features.

18 Claims, 6 Drawing Sheets

COMPUTER 100

(51) Int. Cl.
        *G06F 18/2135*        (2023.01)
        *G06N 20/00*          (2019.01)

(56)                    References Cited

U.S. PATENT DOCUMENTS

| | | |
|---|---|---|
| 2014/0101117 A1 | 4/2014 | Uzzaman |
| 2016/0092516 A1 | 3/2016 | Poola et al. |
| 2016/0155136 A1 | 6/2016 | Zhang et al. |
| 2017/0169360 A1 | 6/2017 | Veeramachaneni et al. |
| 2018/0005676 A1 | 1/2018 | Neil et al. |
| 2018/0022539 A1 | 1/2018 | Vedani |
| 2018/0060211 A1 | 3/2018 | Allen |
| 2018/0158078 A1 | 6/2018 | Hsieh |
| 2018/0225391 A1 | 8/2018 | Sali et al. |
| 2019/0018614 A1 | 1/2019 | Balko |
| 2019/0197236 A1 | 6/2019 | Niculescu-Mizil et al. |
| 2019/0392255 A1 | 12/2019 | Franklin |
| 2020/0045049 A1 | 2/2020 | Apostolopoulos |
| 2020/0076840 A1 | 3/2020 | Peinador |
| 2020/0076841 A1 | 3/2020 | Hajimirsadeghi |
| 2020/0076842 A1 | 3/2020 | Zhou |
| 2020/0082013 A1 | 3/2020 | Triplet et al. |
| 2020/0201727 A1 | 6/2020 | Nie |
| 2020/0381084 A1* | 12/2020 | Kawas ................. G06F 18/2135 |
| 2021/0124981 A1* | 4/2021 | Kim ....................... G06V 10/82 |
| 2022/0156578 A1 | 5/2022 | Allahdadian et al. |
| 2022/0172069 A1* | 6/2022 | Kim ..................... G06N 3/0455 |

OTHER PUBLICATIONS

Ritter GX, Urcid G, Lara-Rodrfguez LO. Similarity Measures for Learning in Lattice Based Biomimetic Neural Networks. Mathematics. Aug. 27, 2020 (Year: 2020).*

Jaworski et al., Concept drift detection using autoencoders in data streams processing. In International Conference on Artificial Intelligence and Soft Computing (Year: 2020).*

Ross, Gordon J., et al. "Exponentially weighted moving average charts for detecting concept drift." Pattern recognition letters 33.2 (Year: 2012).*

He et al., "Deep Residual Learning for Image Recognition", IEEE, dated 2016, 9 pages.

"Machine Learning Approaches for Time Series Data" dated May 19, 2019, 25 pages.

Garcia-Duran et al. "Learning Graph Representations with Embedding Propagation", 31st Conference on Neural Information Processing Systems (NIPS 2017), 12 pages.

Ghosh et al., "Detecting Anomalous and Unknown Intrusions Against Programs", dated 1998, 9 pages.

Gibert et al., "Graph Embedding in Vector Spaces", GbR'2011 Mini-tutorial, dated 2011, 66 pages.

Godin et al. Improving Language Modeling using Densely Connected Recurrent Neural Networks, dated Jul. 19, 2017, 5 pages.

Gogoi, et al., "Packet and Flow Based Network Intrusion Dataset", dated 2012, 12 pages.

Golan et al., "Deep Anomaly Detection Using Geometric Transformations", 32nd Conference on Neural Information Processing Systems (NeurIPS dated 2018), Montréal, Canada, 12 pages.

Graves et al., "Speech Recognition With Deep Recurrent Neural Networks", dated Mar. 22, 2013, 5 pages.

Grover et al., "node2vec: Scalable Feature Learning for Networks", KDD '16, Aug. 13-17, 2016, San Francisco, CA, USA, 10 pages.

HaddadPajouh et al, "A Two-layer Dimension Reduction and Two-tier Classification Model for Anomaly-Based Intrusion Detection in IoT Backbone Networks", dated 2016, 12 pages.

Haider et al., "Generating Realistic Intrusion Detection System Dataset Based on Fuzzy Qualitative Modeling", Journal of Network and Computer Applications 87 (2017) 8 pages.

Faloutsos et al., "Fast Subsequence Matching in Time Series Databases", dated 1998, 11 pages.

Hamilton et al., "Representation Learning on Graphs: Methods and Applications", Copyright 2017 IEEE, 24 pages.

Du et al. DeepLog: Anomaly Detection and Diagnosis from System Logs through Deep Learning, CCS'17, Oct. 30-Nov. 3, 2017, 14 pages.

Hill et al., "Learning Distributed Representations of Sentences from Unlabelled Data", dated Feb. 10, 2016, 11 pages.

Hinton et al., "Neural Networks for Machine Learning", Lecture Overview of mini-batch gradient descent, dated 2012, 31 pages.

Hochreiter, Sepp, "Long Short Term Memory", Nural Computation, dated Nov. 15, 1997, 46 pages.

Hu et al., "Anomalous User Activity Detection in Enterprise Multi-Source Logs", dated Nov. 2017, 8 pages.

Huang et al., "Deep Networks with Stochastic Depth", dated 2016, 16 pages.

Huang et al., "Online System Problem Detection by Mining Patterns of Console Logs", dated Dec. 2009, 11 pages.

Jain et al., "Score normalization in multimodal biometric systems", Pattern Recognition 38, dated Jan. 2005, 16 pages.

Karpathy et al., "Deep Visual-Semantic Alignments for Generating Image Descriptions", dated 2015, 10 pages.

Kim et al., "Behavior-based anomaly detection on big data", Edith Cowan University, Research Online, dated 2015, 9 pages.

Kim, Yongjoon, "Chapter 10, Sequence Modeling: Recurrent and Recursive Nets", dated Apr. 1, 2016, 50 pages.

Kingma et al., "ADAM: a Method for Stochastic Optimization", Published as a conference paper at ICLR 2015, dated Jan. 1, 2017, 15 pages.

Hamilton et al., "Inductive Representation Learning on Large Graphs", 31st Conference on Neural Information Processing Systems (NIPS 2017), Long Beach, CA, USA, 11 pages.

Bishop et al., "Exact Calculation of the Hessian Matrix for the Multi-layer Perceptron", Published in Neural Computation 4 No. 4.dated 1992, 8 pages.

Abe et al., "Developing an Integrated Time-Series Data Mining Environment for Medical Data Mining", Seventh IEEE International Conference on Data Mining—Workshops, dated 2007, 6 pages.

Aggarwal et al., "Analysis of KDD Dataset Attributes—Class wise For Intrusion Detection", 3rd International Conference on Recent Trends in Computing 2015, 10 pages.

Ahmed et al., "An Empirical Comparison of Machine Learning Models for Time Series Forecasting", dated Sep. 15, 2010, 31 pages.

Alexey Tsymbal, "The Problem of Concept Drift: Definitions and Related Work", dated Apr. 29, 2004, 7 pages.

Amazon SageMaker, "DeepAR Forecasting Algorithm", https://docs.aws.amazon.com/sagemaker/latest/dg/deepar.html,last viewed on Jun. 29, 2020, 5 pages.

An et al., "Variational Autoencoder based Anomaly Detection Using Reconstruction Probability", 2015-2 Special Lecture on IE, dated Dec. 27, 2015, 18 pages.

Artificial Intelligence Blog, "Announcing automated ML capability in Azure Machine Learning", dated Sep. 24, 2018, 8 pages.

Bach et al., A Bayesian Approach to Concept Drift, dated 2010, 9 pages.

Bengio et al., "A Neural Probabilistic Language Model", Journal of Machine Learning Research 3, dated Feb. 2003, 19 pages.

Bengio et al., "Conditional Computation in Neural Networks for Faster Models", ICLR 2016, dated Jan. 7, 2016, 12 pages.

Bengio et al., "Learning Deep Architectures for AI", dated 2009, 71 pages.

Gama et al., "A Survey on Concept Drift Adaptation", ACM Computing Surveys, vol. 1, No. 1, Article 1, Publication date: Jan. 2013, 44 pages.

Berlin et al., "Malicious Behavior Detection using Windows Audit Logs", dated Aug. 25, 2015, 10 pages.

Kolosnjaji et al., "Deep Learning for Classification of Malware System Call Sequences", dated 2016, 12 pages.

Bontemps et al., "Collective Anomaly Detection based on Long Short Term Memory Recurrent Neural Network", dated Mar. 2017, 13 pages.

Brownlee, Jason, "Time Series Forecasting as Supervised Learning", dated Aug. 21, 2019, 2 pages.

(56) References Cited

OTHER PUBLICATIONS

Buczak et al., "A Survey of Data Mining and Machine Learning Methods for Cyber Security Intrusion Detection", IEEE Communications Surveys & Tutorials, vol. 18, No. 2, Second Quarter 2016, 24 pages.

Camerra et al., "Beyond one billion time series: indexing and mining very large time series collections with iSAX2+", dated Feb. 16, 2013, 29 pages.

Cao et al., "Collective Anomaly Detection Based on Long Short Term Memory Recurrent Neural Network", dated Mar. 2017, 13 pages.

Chakraborty et al., "Early detection of faults in HVAC systems using an XGBoost model with a dynamic threshold", Energy and Buildings, dated 2019, pp. 326-344.

Chang et al., "A Dynamic Threshold Decision System for Stock Trading Signal Detection", Applied Soft Computing 11, dated 2011, 13 pages.

Conneau et al. "Supervised Learning of Universal Sentence Representations from Natural Language Inference Data", Dated Jul. 21, 2017, 12 pages.

Dai et al., "Semi-supervised Sequence Learning", dated 2015, 9 pages.

Ding et al., "PCA-Based Network Traffic Anomaly Detection" Tsinghua Science and Technology, vol. 21, No. 5, Oct. 2016, 10 pages.

Dong et al., "Quality-Based Dynamic Threshold for Iris Matching", IEEE, dated 2009, 4 pages.

Bengio et al., "Learning Long-Term Dependencies with Gradient Descent is Diffucult", IEEE Transactions on Neural Networks, vol. 5, No. 2, dated Mar. 1994, 10 pages.

Tuor et al., "Deep Learning for Unsupervised Insider Threat Detection in Structured Cybersecurity Data Streams", dated Dec. 15, 2017, 9 pages.

Radford et al., "Network Traffic Anomaly Detection Using Recurrent Neural Networks", dated Mar. 2018, 8 pages.

Ruder, Sebastian, "An Overview of Gradient Descent Optimization Algorithms", dated Jun. 15, 2017, 14 pages.

Sabokrou et al., "Real-Time Anomaly Detection and Localization in Crowded Scenes", dated 2015, 7 pages.

Schoenfeld et al., "Preprocessor Selection for Machine Learning Pipelines", dated 2018, 7 pages.

Scholkopf et al. "Estimating the Support of a High-Dimensional Distribution", dated Nov. 27, 1999, 28 pages.

Seleznyov et al., "Anomaly Intrusion Detection Systems: Handling Temporal Relations between Events", dated 1999, 12 pages.

Shen et al., "Scalable Large-Margin Mahalanobis Distance Metric Learning", IEEE, vol. 30, No. 9, dated 2010, 7 pages.

Shipmon et al., "Time Series Anomaly Detection", Detection of Anomalous Drops with Limited Features and Sparse Examples in Noisy Highly Periodic Data, dated 2017, 9 pages.

Shiravi et al., "Toward Developing a Systematic Approach to Generate Benchmark Datasets for Intrusion Detection", dated Feb. 28, 2011, 18 pages.

Singh et al., "Quantitative Evaluation of Normalization Techniques of Matching Scores in Multimodal Biometric Systems", Springer-Verlag Berlin Heidelberg, dated 2007, 10 pages.

Song et al., "Deep r-th Root of Rank Supervised Joint Binary Embedding for Multivariate Time Series Retrieval", KDD 2018, dated Aug. 19-23, 2018, London, United Kingdom, 10 pages.

Kiros et al., "Skip-Thought Vectors", dated 2015, 9 pages.

Sutskever et al., "Sequence to Sequence Learning with Neural Networks", dated 2014, 9 pages.

Piad-Morffis et al., "A Neural Network Component for Knowledge-Based Semantic Representations of Text", Recent Advances in Natural Language Processing, dated Sep. 2019, pp. 904-911.

Usama et al., "Unsupervised Machine Learning for Networking: Techniques, Applications and Research Challenges", dated Sep. 19, 2017, 37 pages.

Wang et al., "Experimental comparison of representation methods and distance measures for time series data", dated Feb. 12, 2010, 35 pages.

Webb et al., Characterizing Concept Drift, Data Mining and Knowledge Discovery, dated Jul. 2016, 30 pages.

Wei et al., "Graph embedding based feature selection", Neurocomputing 93 dated May 17, 2012, 11 pages.

Xiang et al., "Learning a Mahalanobis distance metric for data clustering and classification", Pattern Recognition 41, dated 2008, 13 pages.

Xu et al., "Detecting Large-Scale System Problems by Mining Console Logs", dated 2009, 16 pages.

Yamanishi et al., "Dynamic Syslog Mining for Network Failure Monitoring", KDD'05 Aug. 21-24, 2005, Chicago, Illinois, USA, 10 pages.

Yen et al., "Beehive: Large-Scale Log Analysis for Detecting Suspicious Activity in Enterprise Networks", ACSAC '13 dated Dec. 9-13, 2013, New Orleans, Louisiana, USA, 10 pages.

Yousefi-Azar et al., "Autoencoder-based Feature Learning for Cyber Security Applications", dated 2017, 8 pages.

Yuanzhong, Zhu, "Intrusion Detection Method based on Improved BP Neural Network Research", International Journal of Security and Its Applications vol. 10, No. 5 (2016) pp. 193-202.

Zhang et al, "Network Anomaly Detection Using One Class Support Vector Machine", Proceedings of the International MultiConference of Engineers and Computer Scientists 2008 vol. 1, Mar. 19, 2008, 5 pages.

Srivastava et al. "Highway Networks", dated Nov. 2015, 6 pages.

Mikolov et al., "Distributed Representations of Words and Phrases and their Compositionality", dated 2013, 9 pages.

Zhang et al., "Automated IT System Failure Prediction: A Deep Learning Approach", dated 2016, 11 pages.

Kolter et al., "Dynamic Weighted Majority: An Ensemble Method for Drifting Concepts", Journal of Machine Learning Research 8, dated 2007, 36 pages.

Le et al., "Distributed Representations of Sentences and Documents", Proceedings of the 31 st International Conference on Machine Learning, Beijing, China, dated 2014, 9 pages.

Lin et al., "Experiencing SAX: a novel symbolic representation of time series", dated Apr. 3, 2007, 38 pages.

Liu et al., "Detecting and Preventing Cyber Insider Threats: A Survey", IEEE Communications Survey & Tutorials, dated 2018, 21 pages.

Liu et al., "Isolation Forest", dated 2008, 10 pages.

Loganathan et al., "Sequence to Sequence Pattern Learning Algorithm for Real-time Anomaly Detection in Network Traffic", conference paper dated May 2018.

Luo et al., "A Revisit of Sparse Coding Based Anomaly Detection in Stacked RNN Framework", IEEE, dated 2017, 9 pages.

Maglaras et al. "A real time OCSVM Intrusion Detection module with low overhead for SCADA systems", International Journal of Advanced Research in Artificial Intelligence, vol. 3, No. 10, 2014, 9 pgs.

Malhotra et al., "Long Short Term Memory Networks for Anomaly Detection in Time Series", ESANN 2015, dated Apr. 2015, 6 pages.

Malhotra et al., "Long Short Term Memory Networks for Anomaly Detection in Time Series", ESANN dated Apr. 2015 proceedings, 6 pages.

Plotz et al., "Feature Learning for Activity Recognition in Ubiquitous Computing", dated Jan. 2011, 7 pages.

Mei et al., "Learning a Mahalanobis Distance based Dynamic Time Warping Measure for Multivariate Time Series Classification", IEEE, dated 2015, 12 pages.

Platt, John, "Probabilistic Outputs for Support Vector Machines and Comparisons to Regularized Likelihood Methods", dated Mar. 6, 1999, 11 pages.

Mikolov et al., "Efficient Estimation of Word Representations in Vector Space", dated Sep. 7, 2013, 12 pages.

Mikolov, Tomas, "Recurrent Neural Network Based Language Model", dated Jul. 20, 2010, 24 pages.

(56)                    References Cited

OTHER PUBLICATIONS

Mirza Ali H et al., "Computer Network Intrusion Detection Using Sequwnrial LSTM Neural Networks Autoencoders", dated May 2, 2018, 2018 26th Signal Processing and Communicaitons Applications Con. 4 pgs.

Mnih et al., "A Scalable Hierarchical Distributed Language Model", dated 2009, 8 pages.

Moustafa et al., "A holistic review of Network Anomaly Detection Systems: A comprehensive survey", Journal of Network and Computer Applications vol. 128, Feb. 15, 2019, pp. 33-55.

N. Krishnavardhan, "A Framework To Identify Cybercrime Using Data Analytics", International Journal of Pure and Applied Mathematics, vol. 120, No. 6 dated Jun. 11, 2018, 14 pages.

Nandan et al., "Fast SVM Training Using Approximate Extreme Points", Journal of Machine Learning Research 15 dated 2014, pp. 59-98.

Naseer et al., "Enhanced Network Anomaly Detection Based on Deep Neural Networks", Journal of Latex Class Files, vol. 14, No. 8, Aug. 2015, 16 pages.

Ng, "Data preprocessing for machine learning: options and recommendations", dated Jun. 22, 2020, 12 pages.

Paoli et al., "Forecasting of preprocessed daily solar radiation time series using neural networks", Solar Energy, Elsevier, dated 2010, 43 pages.

Perozzi et al., "DeepWalk: Online Learning of Social Representations", dated 2014, 10 pages.

Klapper-Rybicka et al., "Unupervised Learning in LSTM Recurrent Neural Networks", dated 2001, 8 pages.

Mathuranathan, Q Function and Error functions : Demystified, dated Jul. 16, 2012, https://www.gaussianwaves.com/2012/07/q-function-and-error-functions/, 7 pages.

Peinador, U.S. Appl. No. 16/122,398, filed Sep. 5, 2018, Office Action, Oct. 28, 2020.

Watson Openscale, "Drift Detection", https://dataplatform.cloud.ibm.com/docs/content/wsj/model/wos-behavior-overview.html, dated Jul. 2021, 5 pages.

Strobl et al., "Bias in Random Forest Variable Importance Measures: Illustrations,Sources and a Solution", Research Report Series, Report 40, http://epub.wu.ac.at/1274/, Sep. 2006, 22 pages.

Rabanser et al., "Failing Loudly: An Empirical Study of Methods for Detecting Dataset Shift", arXiv:1810.11953v4, https://tensorflow.org/tfx/data_validation/get_started#checking_data_skew_and_drift, Year 2019, 38 pages.

Panday et al., "Feature Weighting as a Tool for Unsupervised Feature Selection", Information Processing Letters, https://doi.org/10.1016/j.ipl.2017.09.005, Year 2017, 12 pages.

Liu et al., "Imbalanced Text Classification: A Term Weighting Approach", Department of Industrial and Systems Engineering, The Hong Kong Polytechnic University, dated 2007, 12 pages.

Lazarevic et al., "Feature Bagging for Outlier Detection", Proceedings of the Eleventh ACM SIGKDD International Conference on Knowledge Discovery in Data Mining, Year 2005, 10 pages.

Google Cloud Blog, "Event-Triggered Detection of Data Drift in ML Workflows", : https://cloud.google.com/blog/topics/developers-practitioners/event-triggered-detection-data-drift-ml-workflows, dated Jul. 2021, 12 pages.

Databricks Webinar, "Productionizing Machine Learning: From Deployment to Drift Detection", https://databricks.com/wp-content/uploads/2019/09/8-1-2019-Productionizing-ML_-From-Deployment-to-Drift-Detection-Webinar.pdf, 2019, 45 pages.

Carta et al., "A Local Feature Engineering Strategy to Improve Network Anomaly Detection", Department of Mathematics and Computer Science, University of Cagliari, dated Oct. 21, 2020, 30 pages.

Azure Machine Learning, "Detect Data Drift (Preview) on Datasets", https://docs.microsoft.com/en-us/azure/machine-learning/how-to-monitor-datasets?tabs=python, dated Jul. 2021, 18 pages.

Tang et al., "Feature Selection for Classification: A Review", Data Classification: Algorithms And Applications, 2014, 33 pages.

* cited by examiner

FIG. 2

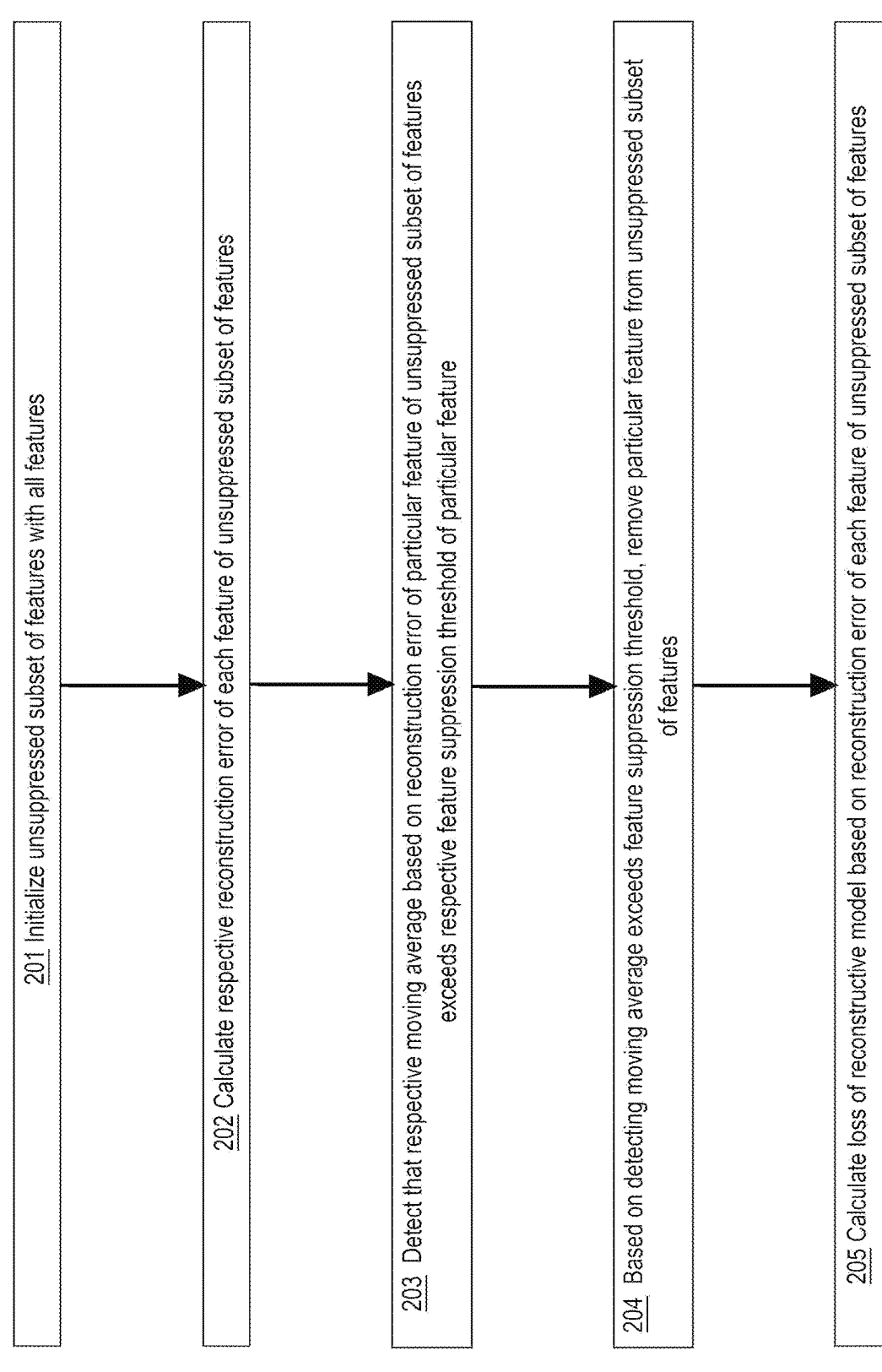

201 Initialize unsuppressed subset of features with all features

202 Calculate respective reconstruction error of each feature of unsuppressed subset of features 203 Detect that respective moving average based on reconstruction error of particular feature of unsuppressed subset of features exceeds respective feature suppression threshold of particular feature 204 Based on detecting moving average exceeds feature suppression threshold, remove particular feature from unsuppressed subset of features 205 Calculate loss of reconstructive model based on reconstruction error of each feature of unsuppressed subset of features

FIG. 3

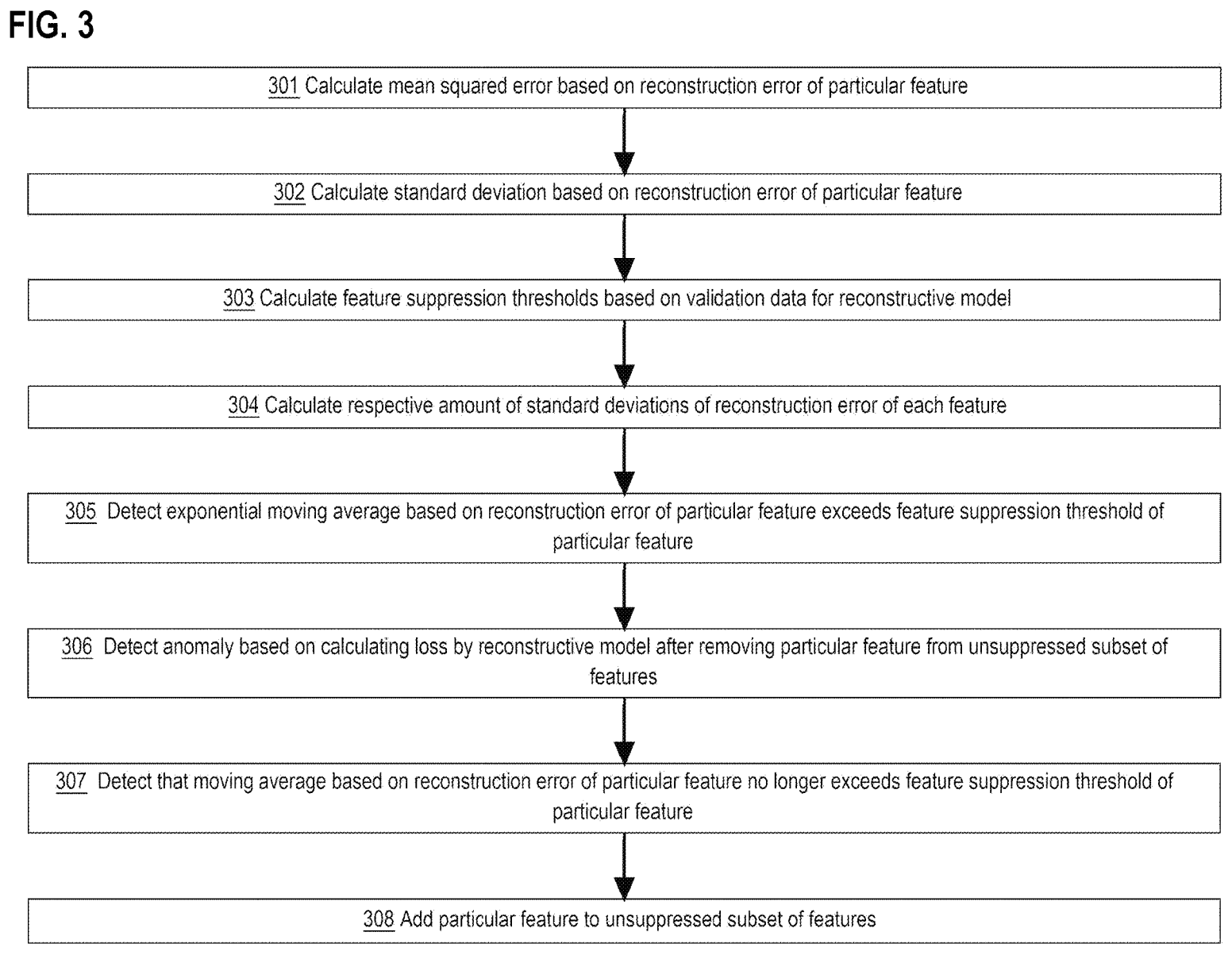

301 Calculate mean squared error based on reconstruction error of particular feature 302 Calculate standard deviation based on reconstruction error of particular feature 303 Calculate feature suppression thresholds based on validation data for reconstructive model 304 Calculate respective amount of standard deviations of reconstruction error of each feature 305 Detect exponential moving average based on reconstruction error of particular feature exceeds feature suppression threshold of particular feature 306 Detect anomaly based on calculating loss by reconstructive model after removing particular feature from unsuppressed subset of features 307 Detect that moving average based on reconstruction error of particular feature no longer exceeds feature suppression threshold of particular feature 308 Add particular feature to unsuppressed subset of features 401 Train reconstructive model 402 Apply reconstructive model to new dataset 403 Detect that count of features removed from unsuppressed subset of features exceeds retrain threshold 404 Apply reconstructive model to amount of new data 405 Detect that amount of new data exceeds sufficiency threshold 406 Retrain reconstructive model

COPING WITH FEATURE ERROR SUPPRESSION: A MECHANISM TO HANDLE THE CONCEPT DRIFT

FIELD OF THE INVENTION

The present invention relates to reconstructive models such as an autoencoder for anomaly detection. Herein are machine learning techniques that detect and suppress any feature that causes model decay by concept drift.

BACKGROUND

Anomaly detection is an important tool with various use cases in security such as fraud detection and intrusion detection. A powerful approach recently employed in anomaly detection involves machine learning models such as reconstructive neural nets such as an autoencoder. Anomaly detection using such models can be categorized into two groups of existing techniques. In the first group, the entire dataset is used for model training, and the reconstructive model is used to detect anomalies inside that dataset. In the second group, the data is discretized into three parts: training, validation, and test. The reconstructive model is trained on the training dataset and then fine-tuned using the validation dataset. Subsequently the trained and validated model is applied to the test dataset. The test dataset can be a nearly infinite stream of data incoming to the reconstructive model. Although such models can be made somewhat robust to input noise, they cannot handle input data distribution changes, which is a phenomenon called concept drift or data drift.

In one example, concept drift occurs when a series of inputs evolves over time such that later normal inputs have feature values that are no longer within the value range of earlier normal inputs such as training inputs. For example, a reconstructive model may be a classifier that learned to distinguish normal tree seedlings from normal weeds because seedlings are smaller than weeds. However over time, seedlings may grow to be a same size as weeds or grow into trees that are bigger than weeds, which may confuse the classifier. For example, the classifier may mistakenly classify an older seedling as a weed.

Concept drift may have various causes. For example, seasonality may cause a normal temperature range to shift such that a normal temperature may be mistakenly detected as anomalous or an abnormal temperature may be mistakenly detected as non-anomalous. Seasonality may influence consumer preferences which may interfere with a predictive machine learning model for a supply chain or for behavioral advertisement targeting.

Concept drift naturally happens in many or most real-world systems, where the system is inherently dynamic or dependent on dynamic parameters such as the evolving state of a server machine in time. Such shifts in data are usually inevitable because the system is dynamic and cannot be controlled or predicted in every aspect. Moreover, machine learning model performance is highly dependent on the distribution of previous data involved during a training phase. After fitting to training data, a machine learning model may be unable to handle concept drift.

In industry, an existing solution for concept drift is usually to retrain the machine learning model with new data, in which case, the retrained model learns the new distribution of the data and can do well in detecting anomalies happening after the concept drift that necessitated retraining. However, a sufficient amount of data is needed after the concept drift in order to be able to retrain the model, which means, in some applications, several hours or days need to pass to be able to accumulate enough real data from a concept drift before retraining. In addition, retraining a machine learning model and redeploying it after a concept drift usually takes significant amount of time. In those ways, retraining may impose a somewhat prolonged service outage of a machine learning model.

BRIEF DESCRIPTION OF THE DRAWINGS

In the drawings:

FIG. 2 is a flow diagram that depicts an example computer process that can detect and suppress, for a reconstructive model, any feature that causes model decay by concept drift;

FIG. 3 is a flow diagram that depicts example computer activities for monitoring and suppression of features;

DETAILED DESCRIPTION

Figure 1:
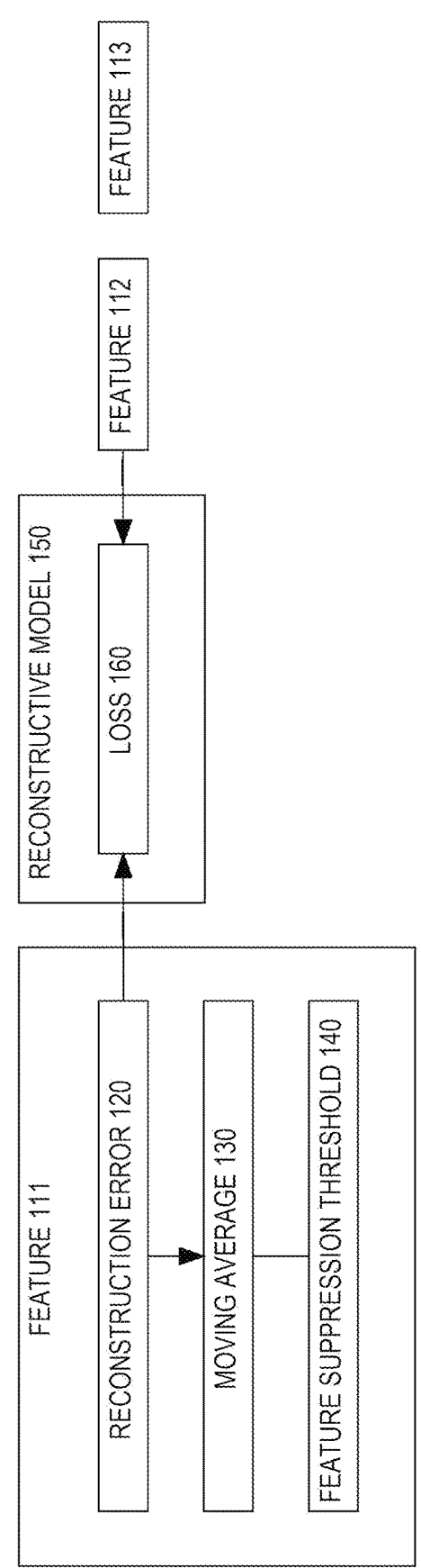
FIG. 1 is a block diagram that depicts an example computer that detects and suppresses, for a reconstructive model such as an autoencoder for anomaly detection, any feature that causes machine learning (ML) model decay by concept drift.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present invention relates to reconstructive models such as an autoencoder for anomaly detection. Herein are machine learning techniques that detect and suppress any feature that causes model decay by concept drift. To avoid a service outage for model retraining, concept drift should be compensated for even before substitution of a newly trained model is possible. An ideal coping strategy should have minimum effect on the output of the anomaly detection model while minimizing the effect of concept drift. The feature-based error suppression techniques herein robustly cope with concept drift by suppressing a minimal amount of statistically selected input features to a reconstructive anomaly detection model to keep the accuracy of anomaly detection high.

Approaches herein provide metrics and strategies that continuously follow the distribution of reconstruction outputs from an anomaly detector machine learning model and deal with errors in model outputs stemming from an inevitable concept drift in the input data. Exponential moving average (EMA) is used to compute distribution parameters of all outputs of a reconstructive anomaly detector model. By monitoring these parameters, concept drift can be detected using a statistical test. Detected flawed input features will be suppressed from participation in calculating output anomaly scores. In that way, the output scores of the anomaly detection model will be coped and robust to the concept drift.

Moving statistics of a distribution are used in unrelated areas such as signal processing, but never to create statistical parameters of reconstruction errors from a reconstructive anomaly detection model to detect the most affected features for the purpose of coping with concept drift. Suppressing features in calculation of anomaly scores in a reconstructive anomaly detection model is previously unused to cope with concept drift in input data. Based on the number of coped features and the computed moving parameters, an automatic alarm may indicate how severe is concept drift and whether or not a reconstructive model needs retraining.

Herein are statistical moving parameters for monitoring the reconstruction behavior of every input feature. Statistical moving parameters can follow the distribution of errors from a reconstructive anomaly detection model. These parameters give important information about the behavior of the errors of each feature over time and can be used to find features most affected by concept drift. For example, EMA is computationally efficient and therefore suitable for large scale problems. These moving statistical parameters can be used to inform when retraining is required and to quantify the intensity of the concept drift. These moving statistics are robust in distinguishing between abrupt changes in the input data stemming from the natural distribution of data compared to prolonged changes from concept drift.

Herein is feature-based error suppression coping that can robustly deal with concept drift in input data by removing as few elements as needed. Computationally, this technique is inexpensive and straight forward to retrofit onto legacy deployments of reconstructive models. There is no need to change the anomaly detection model or retrain it, which saves much time and cost of retraining. There is no need to change the composition of the feature vectors, which keeps the machine learning architecture exactly the same and only applies the coping in the last stage of model loss calculation, as explained herein. This approach can be used in an automated fashion without needing manual intervention. This approach is reversible because it can be used in unidirectional or bidirectional ways to respectively have permanent or temporary effects in dealing with different types of concept drifts.

Applicability of this approach is broad and spans various data-intensive industries, machine learning purposes, and machine learning architectures. This approach can be used for security and operational health monitoring for datacenters and software through log analytics, intrusion detection, and pattern analysis. Enterprise and cloud servers can derive advantage from this approach. In addition, log data analysis has numerous applications in fault detection or security monitoring for internet of things (IoT). This approach can be used for fraud detection in credit card processing and other financial technology (FinTech) security applications.

In an embodiment in a production environment, a computer initializes an unsuppressed subset of features with a plurality of features that an already-trained reconstructive model can process. A respective reconstruction error of each feature of the unsuppressed subset of features is calculated. The computer detects that a respective moving average based on the reconstruction error of a particular feature of the unsuppressed subset of features exceeds a respective feature suppression threshold of the particular feature, which causes removal of the particular feature from the unsuppressed subset of features. After removing the particular feature from the unsuppressed subset of features, a loss of the reconstructive model is calculated based on respective reconstruction errors of the unsuppressed subset of features.

1.0 Example Computer

FIG. 1 is a block diagram that depicts an example computer 100, in an embodiment. Computer 100 detects and suppresses, for a reconstructive model such as an autoencoder for anomaly detection, any feature that causes machine learning (ML) model decay by concept drift. Computer 100 may be one or more of a rack server such as a blade, a personal computer, a mainframe, a virtual computer, a smartphone, or other computing device.

Computer 100 stores already-trained reconstructive model 150 that is an ML model, such as an autoencoder as discussed later herein, in memory. An ML model processes a complex input to generate an inference such as a prediction or classification. Reconstructive model 150 is any ML model that also more or less accurately regenerates its input (not shown). Input reconstruction has different purposes at different phases in the lifecycle of reconstructive model 150 as follows.

An ML model's lifecycle has two phases, which are laboratory training followed by production inferencing. Learning occurs during training, which input reconstruction may improve. Learning may entail internal adjustment of an ML model based on measured error of model inferences.

1.1 Autoencoder

In an embodiment, reconstructive model 150 is an autoencoder. Backpropagation training of an artificial neural network (ANN) such as an autoencoder as discussed later herein may be driven by model error. With supervised training, model error may be measured by comparing an inference by the ML model to a predefined label that is already established as the correct inference. With unsupervised training, such as with an autoencoder, predefined labels may be unavailable, and error may instead be measured based on diagnostic output (not shown) from the autoencoder as follows.

An autoencoder is a multilayer perceptron (MLP) that generally provides dimensionality reduction, regardless of whether the autoencoder is used for classification or anomaly detection. As discussed above, classification entails associating an inferred label with a complex input. In other words, classification entails recognizing a learned pattern. Anomaly detection does the opposite, which is recognizing that an input does not match any learned pattern.

In any case, an autoencoder provides dimensionality reduction, which entails discarding irrelevant features of an input to produce a more concise internal neural representation of the input in which only meaningful input features are retained. In other words, an autoencoder extracts semantic details of a complex, noisy, and fuzzy input. Thus, the autoencoder converts a sparse representation of an input into a dense encoding (not shown). Features and feature representation are discussed later herein.

Generally during training, an autoencoder learns which features should be discarded and how to encode retained semantic features. An autoencoder herein further is a reconstructive model because the autoencoder contains additional neural layers that are trained to regenerate the original input. In other words, the autoencoder encodes input into a semantic coding, which the autoencoder further decodes back into a more or less accurate copy of the input.

In an embodiment, reconstructive model 150 instead is a principal component analysis (PCA). Although operationally very different from an autoencoder, PCA is a reconstructive model that is functionally similar to an autoencoder as follows. Like an autoencoder, PCA undergoes unsupervised training to learn dimensionality reduction and minimize reconstruction error. Architectures of PCA and autoencoders are discussed later herein.

1.2 Reconstruction Error

A measured difference between the original input and the regenerated input (not shown) is known as reconstruction error. Because the original input and the regenerated input are composed of individual features, a difference may be measured between an original feature and a reconstructed feature to calculate a respective reconstruction error for that feature. In other words, a respective reconstruction error may be measured for each of features 111-113. For example, feature 111 has reconstruction error 120. Although not shown, features 112-113 also have reconstruction errors.

Integration, such as summing or averaging, of respective reconstruction errors of all features 111-113 may be used to calculate loss 160 that measures how much relevant information did reconstructive model 150 lose when inferencing for an input. As discussed below, loss 160 may indicate reconstruction error that occurs in a regenerated input as compared to the original input. Loss 160 is informally or mathematically the opposite of inference accuracy. That is, the higher is loss 160, the less reliably did reconstructive model 150 recognize an input. For anomaly detection, high loss 160, such as exceeding a threshold, may indicate that the input is anomalous.

When a reconstructive model is used for classification, reconstruction error may be used as a proxy for inference error. Such use of reconstruction error is especially important for unsupervised learning because, without predefined labels, inference error may be more or less impossible to measure. Thus reconstruction error, instead of inference error, may be used for unsupervised learning by a reconstructive model such as for backpropagation for unsupervised training of an autoencoder.

1.3 Production Inferencing

As mentioned above, training is not the only lifecycle phase of an ML model, and learning is not the only purpose of input reconstruction. The two lifecycle phases of laboratory training and production inferencing are rigid such that all machine learning occurs in the training environment, and no learning occurs in the production environment. That dichotomy may present technical problems as follows.

As explained above, anomaly detection entails recognizing that a complex input matches no learned pattern. In other words, anomaly detection entails recognizing unfamiliarity, which has the following implications.

Accurate input reconstruction is eventually achieved during training. Without training, accurate reconstruction is impossible, in which case reconstruction error is high. By definition, an unfamiliar input is any input that reconstructive model 150 was not trained for. Thus an unfamiliar input in a production environment necessarily causes a high reconstruction error.

In a production environment, an unfamiliar input is an anomaly, which is detectable due to its high reconstruction error. Thus, reconstructive model 150 detects an anomaly when a reconstruction error exceeds a threshold. However even in a production environment, an anomaly is not the only possible cause of reconstruction error.

1.4 Concept Drift

In a production environment, drift also causes reconstruction error such as concept drift, a.k.a. data drift. In one example, concept drift occurs when a series of inputs evolves over time such that later normal inputs have feature values that are no longer within the value range of earlier normal inputs such as training inputs.

For example, reconstructive model 150 may be a classifier that learned to distinguish normal tree seedlings from normal weeds because seedlings are smaller than weeds. However over time, seedlings may grow to be a same size as weeds or grow into trees that are bigger than weeds, which may confuse the classifier. For example, the classifier may mistakenly classify an older seedling as a weed.

Concept drift may have various causes. For example, seasonality may cause a normal temperature range to shift such that a normal temperature may be mistakenly detected as anomalous or an abnormal temperature may be mistakenly detected as non-anomalous. Seasonality may influence consumer preferences which may interfere with a predictive ML model for a supply chain or for behavioral advertisement targeting.

Concept drift may occur in technical environments such as internet of things (IoT) telemetry or enterprise operations monitoring. For example, as operational trends cause a datacenter's inventory to grow or cause operations to span additional datacenters, various evolutionary changes may occur. For example, contents and patterns of network traffic may evolve, and contents of console logs may evolve. Even a disturbance as innocuous as a software application upgrade or patch may cause such contents and patterns to shift. Thus, natural indications of operations as normal or anomalous may have different value ranges at different times such as according to various gradual trends or sudden planned changes such as according to capacity planning.

Such concept drift causes reconstruction error that, in known approaches, an anomaly detector such as an autoencoder will be unable to distinguish from an actual anomaly such as an accidental outage or a malicious intrusion. In other words and according to known approaches, concept drift causes an anomaly detector to raise a false alarm. If that anomaly detector repeatedly or continuously raises false alarms, the anomaly detector may become more or less useless for two reasons. First, system administrators waste much time with manual forensics and diagnostics to decide whether an alarm is correct or not. Second, system administrators learn to ignore the malfunctioning anomaly detector such that a true alarm for a real problem goes unnoticed.

Such malfunctioning due to concept drift is known as model decay. Computer 100 compensates for model decay in two reactive steps. First, computer 100 detects which of many input features 111-113 has drifted beyond a historically normal range. Second, the offending feature(s) are suppressed as explained later herein.

1.5 Input Features

Computer 100 measures and uses feature metrics such as reconstruction error 120, moving average 130, and feature suppression threshold 140 to monitor and interpret the behavior of reconstructive model 150 as discussed later herein. By operating those feature metrics, computer 100 can: distinguish a true anomaly from concept drift, and detect which of features 111-113 are problematic due to concept drift.

Computer 100 may operate those feature metrics in a live environment with a high-speed input stream of inputs such as telemetry without incurring additional latency nor consuming excessive computational resources such that processing overhead for those metrics does not interfere with reconstructive model 150 that provides low-latency inferences in real time.

As discussed earlier herein, a respective reconstruction error such as 120 is separately measured for each individual feature 111-113 for a current input. Although presented as an empirically observed measurement, reconstruction error actually is calculated by a respective error function (not shown) for each individual feature 111-113. In an embodiment, each error function accepts two arguments and returns one scalar result. The arguments are: the reconstructed value of a feature, and the original value of the same feature as actually provided in the current input.

In an embodiment, a complex input is provided as a feature vector (not shown) that contains a respective value for each of all features 111-113. In an embodiment, the feature vector is homogenous such that respective values of all features are encoded as a same datatype such as a same primitive datatype such as an integer or a unit normalized real number such as floating point. In an embodiment, the feature vector is heterogenous such that each feature may have its own respective datatype.

In an embodiment, a sequential feature such as a calendar month may be encoded as a zero or one based unsigned integer such as 1-12 instead of as text strings such as January. In an embodiment, categorical features such as a feature of unordered and mutually exclusive choices such as tea flavors may be so-called one-hot encoded as a group of mutually exclusive Boolean features. For example, one choice from three flavors may be encoded into three Boolean features in which the corresponding feature is true and the two other Boolean features are false in the feature vector. In an embodiment, a Boolean feature is encoded as a number.

The implementation of a feature's error function compares the original and reconstructed values of the feature to calculate a numeric score that measures a magnitude of a difference between the original and reconstructed values of the feature. In various embodiments, respective error functions of different features each returns a reconstruction error in a same or different numeric range that is respectively normalized or not. For example, some or all error functions may return a real number in the range of 0-1 where zero means perfect reconstruction of an exact match and one means that the reconstruction bears no resemblance to the original value. Here error is, mathematically or informally, the opposite of accuracy.

Techniques herein are robust to support other error ranges that may include negative and positive values and/or unnormalized values. Compensation for such diversity of values may entail squaring and/or range normalization. Thus, reconstruction error 120 is not a raw error as observed or measured, but instead a calculated result that is derived from the raw error as discussed later herein.

1.6 Anomaly Detection

By definition, an anomalous input is unlike other inputs. Whether a current input is by itself anomalous depends only on current reconstruction errors for the features of the current input. According to approaches herein and unlike anomaly detection, concept drift extends beyond any one input to affect many or most inputs, which may render useless other anomaly detection techniques as discussed earlier herein. Techniques herein detect that reconstruction error 120 is abnormal in too many of a sequence of inputs as follows.

Although anomaly detection and concept drift detection are both based on reconstruction error, observable differences are as follows. Anomaly detection alerts a sudden spike in reconstruction error of feature(s). Concept drift can be gradual or sudden depending on its cause. Concept drifts are mostly permanent while anomalies are usually sudden. Concept drift detection is based on past as well as current reconstruction errors as follows.

Computer 100 uses moving averages, such as 130, of respective reconstruction errors of features 111-113 as follows. That is, each of features 111-113 has its own moving average of its own reconstruction error. Moving average 130 may serve two purposes. First, moving average 130 provides smoothing such that a sudden spike in current reconstruction error 120 of feature 111 should not by itself cause a reaction for concept drift detection as the spike should for anomaly detection. That is, moving average 130 facilitates automatically distinguishing an anomalous input from concept drift.

Second, because concept drift is a sustained phenomenon and not fleeting, moving average 130 can indicate a trend in time series data such as a value range shift such as from data drift. Various embodiments may implement moving average calculations of varied complexity such as exponential moving average as discussed later herein.

1.7 Feature Suppression

Regardless of how the moving average is calculated, by one exponential moving average formula or another or as a moving average that is not exponential, in any case, computer 100 individually compares the respective moving average for each feature 111-113 to a respective feature suppression threshold as follows. Each feature such as 111 has its own respective feature suppression threshold such as 140.

For example, when moving average 130 of reconstruction error 120 for feature 111 exceeds feature suppression threshold 140, concept drift is detected. Thus, computer 100 can detect which feature(s) are transitioning from a normal trend to an abnormal trend based on moving averages. When the moving average of any feature 111-113 begins to exceed the respective feature suppression threshold, computer 100 more or less permanently suppresses that feature as follows.

As explained later herein, anomaly detection with loss 160 may be based on mean squared error that is based on reconstruction errors of many features such as all features 111-113. Herein, feature suppression is applied to the calculation of mean squared error such that any feature(s) that have experienced concept drift are excluded from the calculation of loss 160. That is, once concept drift is detected for a feature, that feature becomes and continues to be suppressed by exclusion for the calculation of loss 160 such as by mean squared error.

Thus, mean squared error includes only features for which concept drift is not occurring such that the set of included features monotonically shrinks by attrition over time in the production environment as reconstructive model 150 gradually succumbs to model decay. As explained later herein, mean squared error for features 111-113 entails summation of three reconstruction errors, such as 120, and division by three because three features are included. For example when concept drift is detected for feature 113 and feature 113 becomes suppressed and excluded, mean squared error becomes based on remaining features 111-112 that entails summation of only two errors and division by two because only two features 111-112 are included. That is why feature 112 (i.e. its reconstruction error, not shown) and reconstruction error 120 are shown with arrows as contributing to loss 160 but feature 113 is excluded and not shown as contributing to loss 160. In any case, feature suppression dynamically determines which features contribute to mean square error and which features do not.

Feature suppression as explained above entails adjusting how loss 160 is calculated as needed for detecting whether or not a current input is anomalous. Feature suppression herein does not entail adjusting which features are provided as input to reconstructive model 150. That is, feature suppression does not disturb the width or contents of a feature vector that is provided as input to reconstructive model 150.

In other words, feature suppression in no way alters behavior of reconstructive model 150, no matter how many features are suppressed, because suppression occurs after model inferencing for a current input. That is, feature suppression is downstream of model operation in a dataflow for a current input.

Such downstream feature suppression serves two purposes. First, it prevents abnormally trending feature(s) from causing a false alarm for a mistakenly supposed anomaly. Second, it allows the anomaly detector to remain in reliable service and continue to inspect an ongoing series of inputs without retraining.

1.8 Model Decay

A practical feature vector may have dozens, hundreds, or thousands of features. Although feature suppression causes some adjustment to calculation of loss 160, suppression of a few features is unlikely to disturb the numeric output of a mean squared error calculation for loss 160 because averaging across many features has a smoothing effect. For example with a same feature vector, a mean squared error of all of a hundred normally behaving features is, after concept drift and suppression of some features, likely to be almost identical to a mean squared error of a surviving subset of a remaining ninety normally behaving features.

Despite such attrition of features due to suppression, smoothing occurs because mean squared error is a ratio where feature suppression diminishes both the numerator and denominator of the ratio, thus leaving the ratio more or less unchanged when slightly fewer features contribute. Thus to some extent, suppression of a few features may go almost unnoticed, and suppression of even a larger minority of features may or may not be sufficient to cause the mean squared error calculation to become unreliable. In other words, some concept drift, some model decay, and suppression of some features do not cause loss 160 to become unreliable.

Thus even without retraining, an anomaly detector may remain in service and usefully operating despite suppression of multiple features and long after an anomaly detector with another approach would be rendered entirely useless. Suppression of multiple features by attrition may be managed in various ways as follows.

In an embodiment, reconstructive model 150 is periodically retrained with more recent historic inputs that occurred after concept drift. For example, the reconstructive model may be automatically retrained such as by a periodically scheduled program such as nightly or weekly or monthly that is more frequent than occurrences of excessive concept drift. That is, near the end of such a period, some features may have been suppressed, but reconstructive model 150 never decays enough to become useless. Herein, suppression of features, attrition of features, and model decay are somewhat synonymous and caused by data drift.

In an embodiment without scheduled periodic retraining, a monotonically increasing tally of suppressed features, as a count or as a percentage, is compared to a retrain threshold (not shown) that causes a model decay alert when exceeded. Such excessive model decay means that normal value ranges of too many features have drifted from ranges that reconstructive model 150 was trained for. The retrain threshold is set low enough that some further attrition of additional features may still occur without rendering reconstructive model 150 useless. In other words and as discussed later herein, the retrain threshold provides sufficient advanced notice for automatic or manual administration such as replacement of reconstructive model 150 such as by retraining either immediately or soon such as overnight.

2.0 Feature Suppression Process

FIG. 2 is a flow diagram that depicts an example process that computer 100 may perform to detect and suppress, for reconstructive model 150, any of features 111-113 that causes model decay by concept drift. FIG. 2 is discussed with reference to FIG. 1.

Step 201 is preparatory. For example, step 201 may occur during launch of a software application that contains reconstructive model 150 such as when computer 100 boots. Step 201 initializes the unsuppressed subset of features to include all of features 111-113. In other words, no features are initially suppressed.

The remaining steps 202-205 occur at runtime when reconstructive model 150 inferences based on an input. That is, steps 202-205 are repeated in sequence for each input such as from a stream of inputs. Runtime activities such as error calculation are discussed below with respect to the unsuppressed subset of features. An embodiment may also perform same such activities or calculations for suppressed features for reasons discussed later herein.

Step 202 calculates a respective reconstruction error of each feature of the unsuppressed subset of features. For example as discussed earlier herein, reconstruction error 120 is calculated for feature 111. Mathematics of feature reconstruction error are discussed later herein.

Between steps 202-203, the respective moving average that is based on the reconstruction error of each feature of the unsuppressed subset of features is updated. For example, reconstruction error 120 for a current input is used to update moving average 130. Mathematics of moving averages, such as exponential moving average, are discussed later herein.

Step 203 detects that the respective moving average based on reconstruction error of a particular feature of the unsuppressed subset of features exceeds a respective feature suppression threshold of the particular feature. For example, moving average 130 as updated between steps 202-203 may or may not exceed feature suppression threshold 140.

Conditional step 204 occurs only if a moving average exceeds a feature suppression threshold. In that case, step 204 suppresses the particular feature by removing the particular feature from the unsuppressed subset of features. For example as shown in FIG. 1, feature 113 is removed from the unsuppressed subset of features.

Step 205 calculates loss 160 by reconstructive model 150 based on reconstruction errors of respective unsuppressed features. Calculation of loss 160 is not based on reconstruction errors of suppressed features. Mathematics of model loss are discussed later herein. Loss 160 may be used for anomaly detection. For example, a current input is anomalous if loss 160 exceeds an anomaly threshold.

The process of FIG. 2 provides a generalized way of using feature suppression to compensate for concept drift and model decay. Discussed later herein are FIGS. 3-4 that depict special processing and scenarios for practical feature suppression.

3.0 Activities for Monitoring and Suppression of Features

FIG. 3 is a flow diagram that depicts example activities that a computer, such as an implementation of computer 100, may perform for monitoring and suppression of features.

The process of FIG. 3 occurs in two phases. A preparatory phase that includes steps 301-303 occurs after training of a reconstructive model and before production deployment, such as during or soon after validation of the reconstructive model with validation data. Validation entails exercising the reconstructive model with fewer inputs than during training but enough inputs to detect how the reconstructive model reacts to various representative inputs.

The preparatory phase entails calculation of feature suppression thresholds that may be based on various statistics of results of validation. Steps 301-302 perform intermediate calculations upon which feature suppression thresholds may be based.

Techniques herein are robust to support various value ranges of raw reconstruction error that may include negative and positive values and/or unnormalized values. Compensation for such diversity of values is as follows.

Step 301 calculates mean squared error based on raw reconstruction errors of a particular feature for all inputs during validation. Whether negative or positive, raw reconstruction error is arithmetically squared to ensure a positive value. Thus, while raw errors of a feature at different times may have negative and positive values, the squared error instead isolates error magnitude as an absolute value.

Mean squared error is an average of all of the squared errors during validation for a particular feature. Squared error may also be calculated at runtime in production for a current input to isolate error magnitude as an absolute value for the same reason. Mean squared error from validation may be used as follows.

Squaring for absolute value is not the only way to constrain a value range of reconstruction errors of a feature. Value normalization herein is statistically based on reconstruction errors of a feature from validation. A central tendency is measured as a respective standard deviation based on reconstruction errors of a particular feature for all inputs during validation in step 302. In an embodiment, step 302 calculates the standard deviation of the squared errors of a feature from validation, which are the same squared errors that step 301 averages.

Step 303 calculates a respective feature suppression threshold for each feature based on validation statistics of the reconstructive model. That is, the feature suppression thresholds are calculated before production deployment. In an embodiment, each feature suppression threshold is calculated as $$\frac{\mu_{v,i}}{\max(\sigma_{v,i}, \sigma_{min})} + k,$$

where i is a feature, $\mu_{v,i}$ is the mean squared error of the feature in validation per step 301, $\sigma_{v,i}$ is the standard deviation of the squared errors of the feature in validation per step 302, $\sigma_{min}$ prevents division by zero, and constant k is a sensitivity bias as follows.

Here, k is the number of standard deviations away from the average of a standard Gaussian distribution which has a direct relationship with the probability of an anomaly. The amount of k depends on the risk averseness of a decision maker and stake holders. A higher value of k results in less sensitivity to concept drift and vice versa.

Between steps 303-304 the reconstructive model is deployed into production and begins operation. That is, remaining steps 304-308 occur while the reconstructive model is in service in a production environment. During ordinary operation, step 304 repeats for each input in a stream or batch of inputs.

Step 304 occurs while the reconstructive model analyzes a current input as a preface to generating an inference for the input. The last intermediate activity that occurs before the inference is finally generated is measurement of reconstruction error for each feature. Step 304 downscales the squared error of reconstruction of a feature as follows.

In the production environment, normalized error of a feature is the current squared error of the feature in the production environment divided by the standard deviation of the squared error of the feature during validation per step 302. For example even though respective squared error of different features may differ by two orders of magnitude for a same input, the normalized errors of the features, as respective amounts of respective standard deviations, are less divergent.

Statistically normalized error provides a somewhat more uniform way to detect an abnormal reconstruction value of a feature. However even with normalization, the technical problem of distinguishing anomalous input from concept drift remains and may be solved as follows.

Steps 305-308 are reactive based on results of step 304. That is, steps 305-308 represent special scenarios. Although shown as a sequence, steps 305-307 are unrelated to each other, and seldom would more than one of steps 305-307 occur for a same input. When steps 305 and 307 occur for a same input, they occur for different respective features.

Step 305 detects that an exponential moving average based on reconstruction errors of a feature exceeds the feature suppression threshold of that feature. A moving average is a so-called rolling calculation of varied robustness in various embodiments as follows. A straightforward implementation of a moving average may be based on an accumulator for summation and a counter, which is risky because the accumulator may eventually overflow. In a safer but less efficient embodiment, a moving average is calculated from a limited fixed amount of most recent inputs such as a sliding window of a hundred most recent inputs.

Exponential moving average is a calculation that is safe and efficient with various arithmetic embodiments. In one embodiment, a counter tallies how many inputs were processed so far, and a delta measures an arithmetic difference of a previous moving average less a reconstruction error of a current input. The delta is then scaled down according to a progressively diminishing weight such as 2/counter. That weighted delta is then added to the previous moving average to derive the next moving average.

Various embodiments have various formulae for calculating an exponential moving average. In a most efficient embodiment that lacks a counter, an exponential moving average may instead be calculated as $\mu_{t+1} = \mu_t(1-\alpha) + d_{t+1}\alpha$, where t is an implied count of previous inputs, where $\mu_t$ is the previous moving average, $\mu_{t+1}$ is the next moving average, $d_{t+1}$ is the current reconstruction error per step 304, and $\alpha$ is a constant weight. If step 305 detects that the exponential moving average of a feature exceeds the feature suppression threshold of the feature, then the feature becomes suppressed as discussed earlier herein.

Step 306 detects an anomaly based on calculating a loss by the reconstructive model after suppressing a feature (i.e. removing the feature from the unsuppressed subset of features). Steps 305-306 may occur in sequence for different inputs. For example when processing an earlier input, step 305 may suppress a feature that is drifting too much. If the drifting feature were not suppressed, anomaly detection would become more likely due to increased false positives. Conversely, suppression of the feature tends to make detecting an anomaly less likely. Nonetheless when processing a later input, step 306 may detect that the later input is anomalous even though some feature(s) are suppressed.

Concept drift is a natural phenomenon that, in some cases, is not monotonic and may even naturally reverse by drifting back into a historically normal range. In an embodiment, feature suppression is reversible per steps 307-308 that occur in sequence for an input. Step 307 detects that the moving average based on reconstruction error of a suppressed feature, as calculated for step 305, no longer exceeds the feature suppression threshold of the feature. Such detection causes step 308 to cancel suppression of the feature by adding the feature back into the unsuppressed subset of features. In other words, suppression of a feature may be temporary.

4.0 Example Lifecycle

Figure 4:
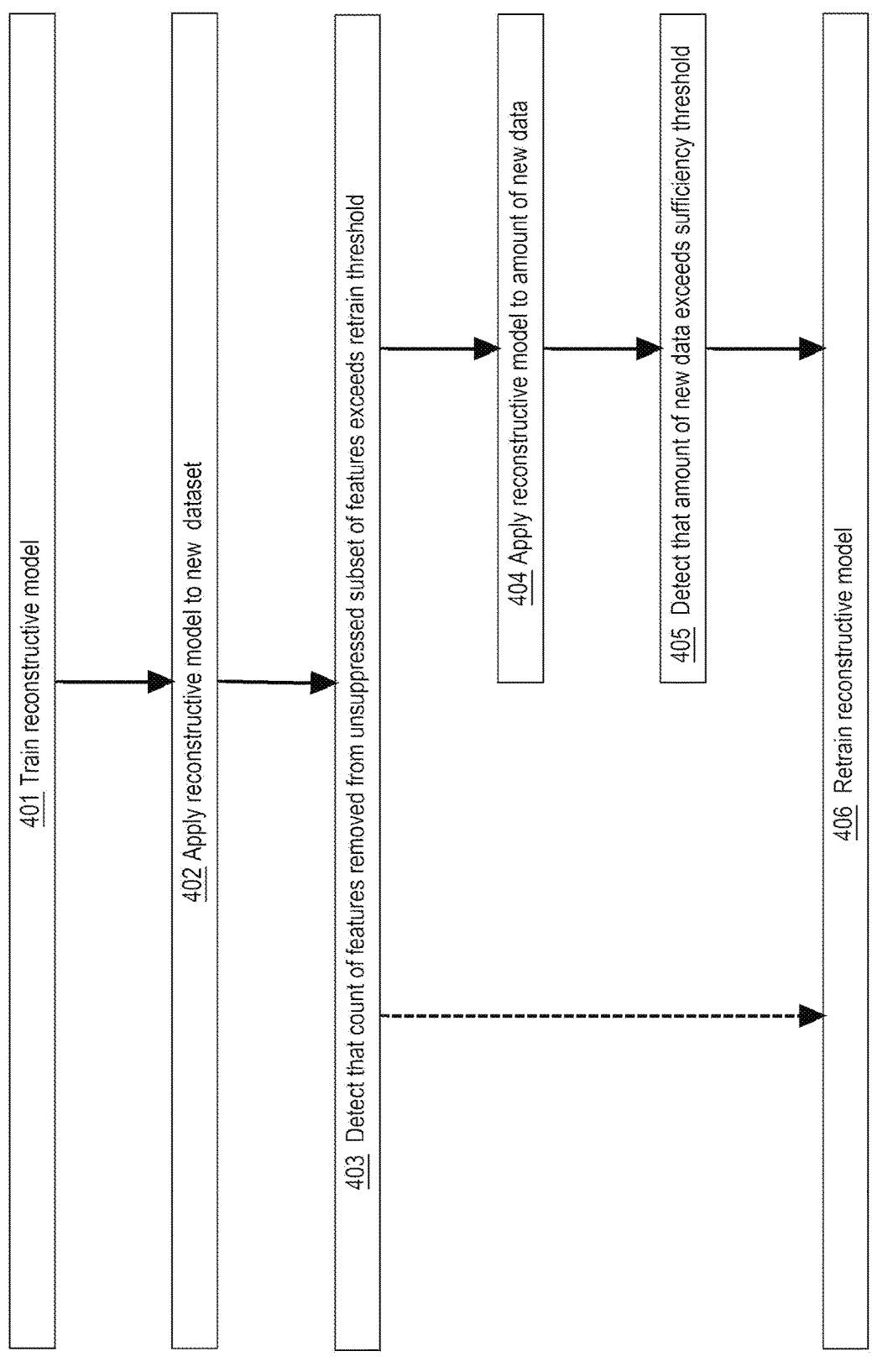
FIG. 4 is a flow diagram that depicts feature suppression affecting an example lifecycle of a reconstructive model.

FIG. 4 is a flow diagram that depicts feature suppression affecting an example lifecycle of a reconstructive model. Feature suppression permits a reconstructive model to remain in service longer than with other approaches by compensating for model decay. The process of FIG. 4 shows ways to achieve nearly uninterrupted service indefinitely based on additional monitoring and reactions.

The lifecycle of a reconstructive model begins with training by step 401. Between steps 401-402, the reconstructive model is deployed into a production environment. While in service, steps 402-403 occur. Depending on the embodiment and as discussed later herein, steps 404-406 may or may not also occur while in service.

Step 402 applies the reconstructive model to a new dataset that may be a very long stream of inputs or a very long sequence of batches such that concept drift occurs and feature(s) are suppressed to compensate for model decay. How much model decay is tolerable depends on the implementation. Eventually, step 403 may detect that a count of suppressed features (i.e. features removed from the unsuppressed subset of features) exceeds a retrain threshold such as a percentage or absolute amount of features.

For example, suppression of five features of a hundred features may be tolerable but suppression of more than ten of those features may break anomaly detection, usually by generating too many false negatives. In other words, too many suppressed features causes anomalies to be undetected.

Retraining the reconstructive model with recent inputs would recalibrate the reconstructive model so that the reconstructive model could operate without suppressing any features. In other words, retraining would eliminate the model decay. However, retraining may entail technical problems as follows.

Retraining may take hours, days, or weeks, depending on how large of a training corpus is needed. If the retrain threshold is too high such that many features need suppressing before the retrain threshold is exceeded, then retraining must begin immediately because the model has severely decayed, and immediate retraining may cause a service outage of immense duration. A somewhat lower retrain threshold is better for the following reasons.

In an embodiment, retraining needs to be scheduled such as for a particular time window such as after peak hours. Missing that window even by a little may require deferring training until the following day's window. A lower retrain threshold provides earlier warning so that retraining is not deferred until another day.

In an embodiment, a production environment and a laboratory training environment may simultaneously host separate respective instances of the reconstructive model. That facilitates simultaneously training one instance offline while the other instance remains online and in service. In other words, online service and offline training are not mutually exclusive, and retraining may occur without a service outage. A lower retrain threshold provides earlier warning so that retraining occurs before too much additional model decay breaks the reconstructive model.

In an embodiment shown with the dashed arrow, step 403 detects that the retrain threshold is exceeded, and step 406, as discussed later herein, immediately begins retraining. In another embodiment, steps 404-405 defer retraining as follows.

As explained above, retraining is slow because a large training corpus is involved. Another slow phenomenon is accumulation of recent inputs after concept drift. As a corpus grows, historic inputs that occurred after concept drift eventually predominate over inputs that occurred before concept drift.

In other words, additional time may be needed for the corpus to adequately reflect the drift. Retraining too soon and before sufficient accumulation of drifted inputs may bias the training toward fitting outdated inputs from before the drift. Steps 404-405 prevent retraining too soon by deferring retraining as follows.

Even after step 403 detects that the retrain threshold is exceeded, step 404 continues to apply the reconstructive model to a growing amount of new data in the production environment. Eventually, step 405 detects that the accumulated amount of new data exceeds a sufficiency threshold, which means that the training corpus adequately reflects the scope and magnitude of input variations that can occur after concept drift.

Step 406 retrains the reconstructive model, offline in a laboratory. After the reconstructive model is retrained, it may be redeployed back into production. That is, the retrained model should replace the older version of the reconstructive model that remained in service in the production environment while the newer version was being trained. In an embodiment, hot replacement of the reconstructive model is more or less instantaneous with little or no service outage. In that way and despite complexity of the lifecycle of the reconstructive model, through an evolving sequence of versions, the reconstructive model can remain in uninterrupted service more or less indefinitely.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
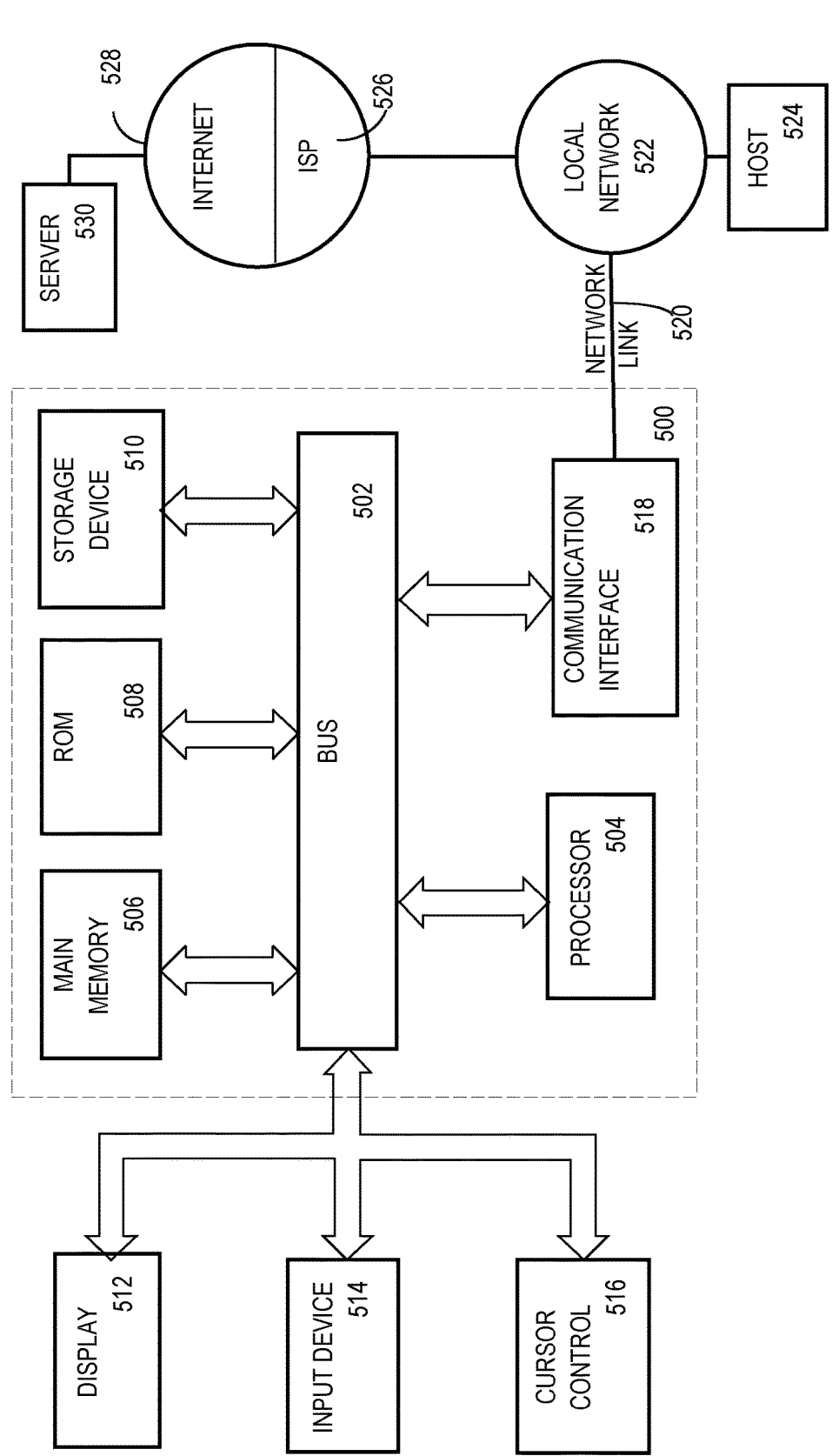
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor

504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
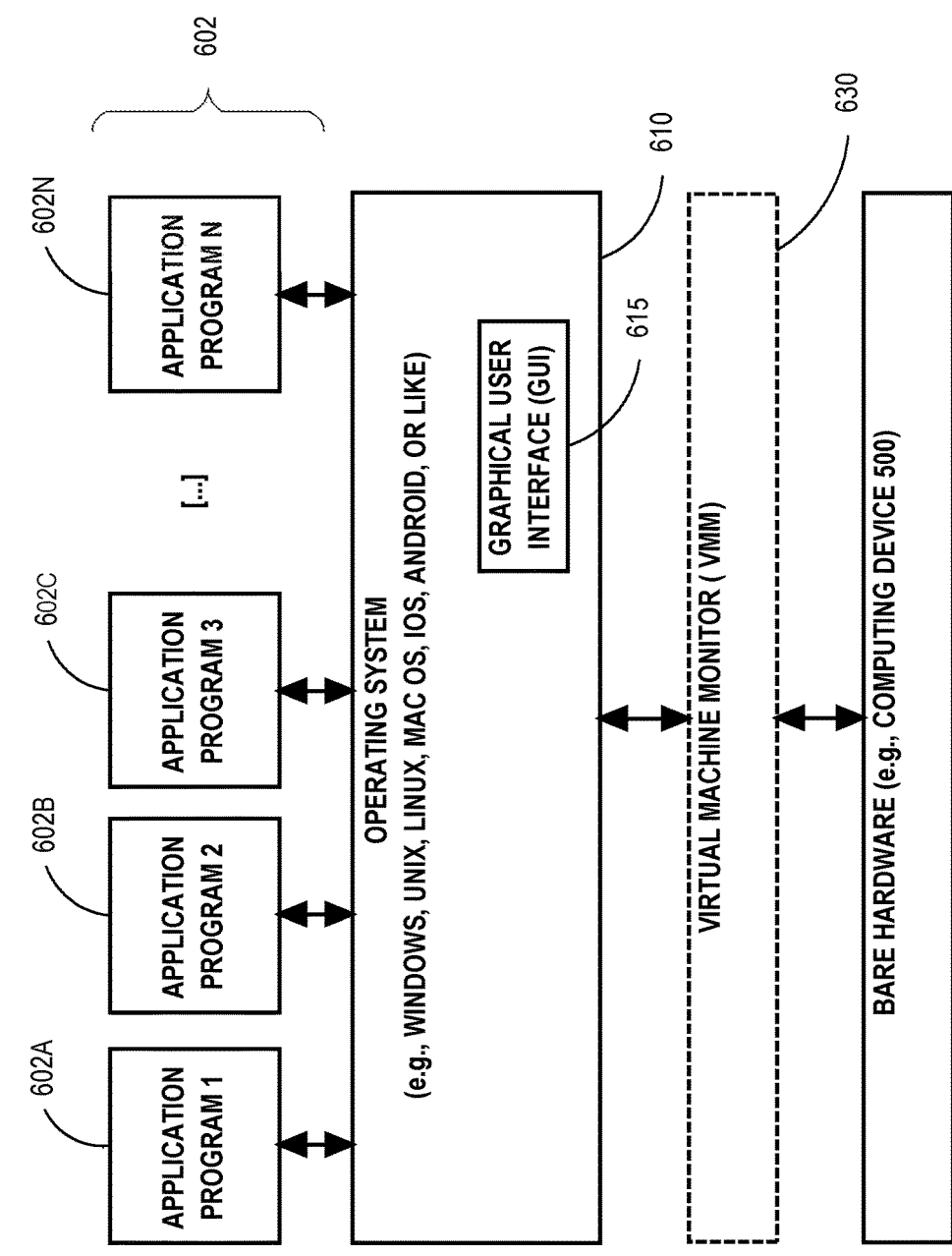
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer $L-1$ to a layer L. Given the number of neurons in layer $L-1$ and L is $N[L-1]$ and $N[L]$, respectively, the dimensions of matrix W is $N[L-1]$ columns and $N[L]$ rows.

Biases for a particular layer L may also be stored in matrix B having one column with $N[L]$ rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL)

"VARIATIONAL AUTOENCODER BASED ANOMALY DETECTION USING RECONSTRUCTION PROBABIL-ITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature F2ootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

initializing an unsuppressed subset plurality of features with a plurality of features that includes a particular feature;

calculating, for a first feature vector that consists of a respective value for each feature in the plurality of features, a respective separate reconstruction error of a trained reconstructive model for each feature of the unsuppressed subset plurality of features;

detecting that a moving average of reconstruction errors of the particular feature exceeds a feature suppression threshold that is exclusively for the particular feature;

removing, in response to said detecting, the particular feature from the unsuppressed subset plurality of features; and calculating, for a second feature vector that consists of a respective value for each feature in the plurality of features after said removing the particular feature from the unsuppressed subset plurality of features, a loss of the trained reconstructive model based on a respective separate reconstruction error of each feature of the unsuppressed subset plurality of features excluding the particular feature;

wherein the method is performed by one or more computers without retraining the trained reconstructive model.

2. The method of claim 1 further comprising detecting an anomaly based on said calculating said loss of the trained reconstructive model after said removing the particular feature from the unsuppressed subset plurality of features.

3. The method of claim 1 wherein said detecting comprises detecting an exponential moving average of reconstruction errors of the particular feature exceeds said feature suppression threshold of the particular feature.

4. The method of claim 1 wherein said loss of the trained reconstructive model is not based on a feature that was removed from the unsuppressed subset plurality of features.

5. The method of claim 1 wherein said calculating the separate reconstruction error of each feature of the unsuppressed subset plurality of features comprises calculating a respective amount of standard deviations of reconstruction error of said each feature.

6. The method of claim 1 further comprising:

generating the trained reconstructive model by training;

applying the trained reconstructive model to a new dataset;

detecting that a count of features removed from the unsuppressed subset plurality of features exceeds a retrain threshold.

7. The method of claim 6 further comprising retraining the trained reconstructive model responsive to said detecting said count of features removed exceeds said retrain threshold.

8. The method of claim 7 wherein:

the method further comprises after said detecting said count of features removed exceeds said retrain threshold, applying the trained reconstructive model to an amount of new data;

said retraining the trained reconstructive model is further responsive to detecting that said amount of new data exceeds a sufficiency threshold.

9. The method of claim 1 further comprising:

detecting that said moving average of reconstruction errors of the particular feature no longer exceeds said feature suppression threshold of the particular feature;

adding, based on said detecting said moving average no longer exceeds said feature suppression threshold, the particular feature to the unsuppressed subset plurality of features.

10. One or more non-transitory computer-readable media storing instructions that, when executed by one or more processors, cause without retraining a trained reconstructive model:

initializing an unsuppressed subset plurality of features with a plurality of features that includes a particular feature;

calculating, for a first feature vector that consists of a respective value for each feature in the plurality of features, a respective separate reconstruction error of the trained reconstructive model for each feature of the unsuppressed subset plurality of features;

detecting that a moving average of reconstruction errors of the particular feature exceeds a feature suppression threshold that is exclusively for the particular feature;

removing, in response to said detecting, the particular feature from the unsuppressed subset plurality of features; and calculating, for a second feature vector that consists of a respective value for each feature in the plurality of features after said removing the particular feature from the unsuppressed subset plurality of features, a loss of the trained reconstructive model based on a respective separate reconstruction error of each feature of the unsuppressed subset plurality of features excluding the particular feature.

11. The one or more non-transitory computer-readable media of claim 10 wherein the instructions further cause detecting an anomaly based on said calculating said loss of the trained reconstructive model after said removing the particular feature from the unsuppressed subset plurality of features.

12. The one or more non-transitory computer-readable media of claim 10 wherein said detecting comprises detecting an exponential moving average of reconstruction errors of the particular feature exceeds said feature suppression threshold of the particular feature.

13. The one or more non-transitory computer-readable media of claim 10 wherein said loss of the trained reconstructive model is not based on a feature that was removed from the unsuppressed subset plurality of features.

14. The one or more non-transitory computer-readable media of claim 10 wherein said calculating the separate reconstruction error of each feature of the unsuppressed subset plurality of features comprises calculating a respective amount of standard deviations of reconstruction error of said each feature.

15. The one or more non-transitory computer-readable media of claim 10 wherein the instructions further cause:

generating the trained reconstructive model by training;

applying the trained reconstructive model to a new dataset;

detecting that a count of features removed from the unsuppressed subset plurality of features exceeds a retrain threshold.

16. The one or more non-transitory computer-readable media of claim 10 wherein the instructions further cause:

detecting that said moving average of reconstruction errors of the particular feature no longer exceeds said feature suppression threshold of the particular feature;

adding, based on said detecting said moving average no longer exceeds said feature suppression threshold, the particular feature to the unsuppressed subset plurality of features.

17. The one or more non-transitory computer-readable media of claim 15 wherein the instructions further cause retraining the trained reconstructive model responsive to said detecting said count of features removed exceeds said retrain threshold.

18. The one or more non-transitory computer-readable media of claim 17 wherein:

the instructions further cause after said detecting said count of features removed exceeds said retrain threshold, applying the trained reconstructive model to an amount of new data;

said retraining the trained reconstructive model is further responsive to detecting that said amount of new data exceeds a sufficiency threshold.

* * * * *